(12) United States Patent
Ishitoko (10) Patent No.: US 6,898,973 B2
(45) Date of Patent: May 31, 2005

(54) VIBRATING GYROSCOPE AND ELECTRONIC DEVICE INCLUDING SAME

(75) Inventor: Nobuyuki Ishitoko, Moriyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/305,913

(22) Filed: Nov. 27, 2002

(65) Prior Publication Data

US 2003/0101816 A1 Jun. 5, 2003

(30) Foreign Application Priority Data

Nov. 29, 2001 (JP) ........................................ 2001-364273

(51) Int. Cl.[7] .............................................. G01P 9/04
(52) U.S. Cl. .................................. 73/504.14; 310/321
(58) Field of Search ........................ 73/504.02, 504.04, 73/504.12, 504.13, 504.14, 504.15, 504.16; 310/321, 367, 368, 369, 370, 348

(56) References Cited

U.S. PATENT DOCUMENTS

| | | | | |
|---|---|---|---|---|
| 4,836,023 A | * | 6/1989 | Oikawa ................... | 73/504.14 |
| 4,898,031 A | * | 2/1990 | Oikawa et al. .......... | 73/504.12 |
| 5,635,647 A | * | 6/1997 | Heinouchi ................ | 73/662 |
| 6,532,816 B2 | * | 3/2003 | Fujimoto ................. | 73/504.14 |
| 2002/0015594 A1 | | 2/2002 | Mori et al. | |
| 2002/0125795 A1 | | 9/2002 | Mori et al | |

FOREIGN PATENT DOCUMENTS

| | | |
|---|---|---|
| DE | 3824990 A1 | 2/1989 |
| DE | 198 00 333 A1 | 7/1998 |
| EP | 1 126 241 A2 | 8/2001 |
| JP | 5-018756 | 1/1993 |
| JP | 9-133531 | * 5/1997 |

* cited by examiner

*Primary Examiner*—Helen Kwok
(74) *Attorney, Agent, or Firm*—Keating & Bennett, LLP (57) ABSTRACT

A vibrating gyroscope includes a vibrator which is retained by supporting members at one end of the supporting members and a housing to which the supporting members are fixed at the other end of the supporting members. A rigid reinforcing plate made of a metal is embedded in the housing made of a resin by insert molding. The rigid reinforcing plate is continuous between positions near fixing portions at which the supporting members are fixed to the housing. Therefore, the rigidity of the housing is increased and the vibration of the vibrator is prevented from being transmitted to the outside. In addition, the temperature drift performance is prevented from being degraded.

16 Claims, 11 Drawing Sheets

A-A CROSS SECTIONAL VIEW

Fig. 4

B-B CROSS SECTIONAL VIEW

PRIOR ART

VIBRATING GYROSCOPE AND ELECTRONIC DEVICE INCLUDING SAME

BACKGROUND OF THE INVENTION

1. Field of the Invention

The present invention relates to vibrating gyroscopes and electronic devices including vibrating gyroscopes. More specifically, the present invention relates to a vibrating gyroscope for use in, for example, a camera-shake correcting device of a video camera, a navigation system, or other apparatus, and to an electronic device including such a vibrating gyroscope.

2. Description of the Related Art

Figure 11:
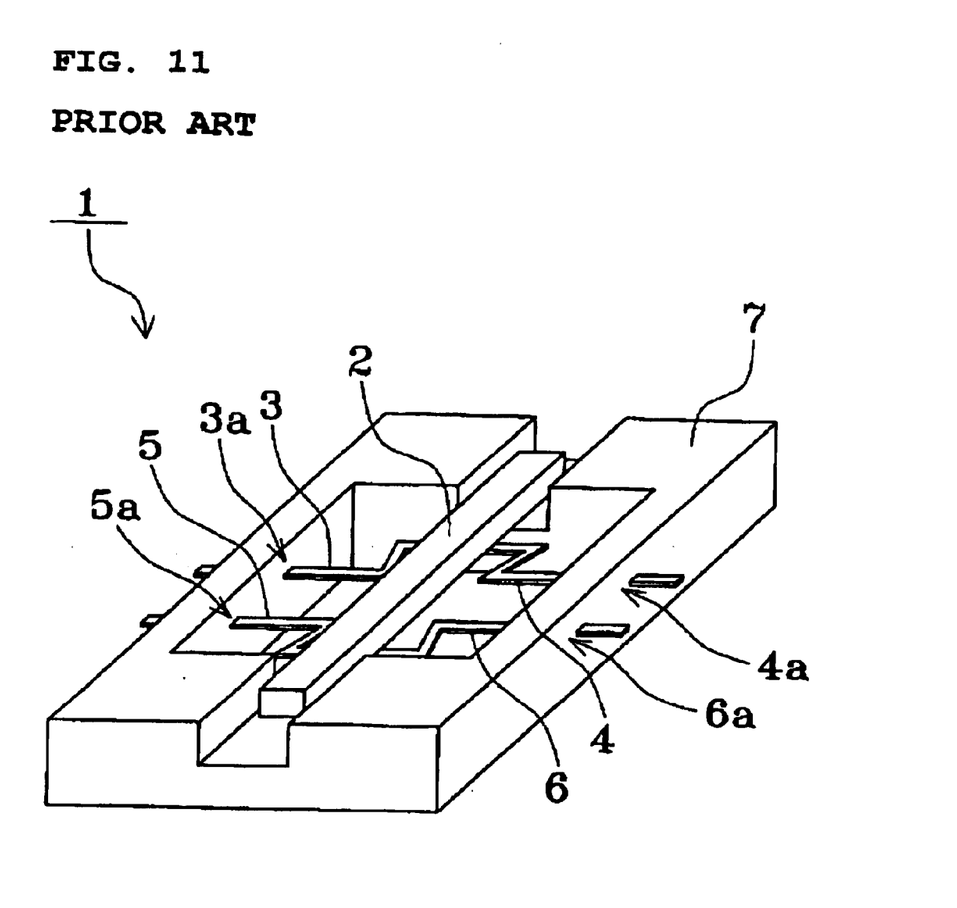
FIG. 11 is a perspective view of a known gyroscope.

FIG. 11 is a schematic perspective view showing the construction of a known vibrating gyroscope. In FIG. 11, a vibrating gyroscope 1 includes a vibrator 2 having a rectangular column shape which is made of a piezoelectric ceramic material, supporting members 3, 4, 5, and 6 which are made of a metal and which are connected to the vibrator 2, and a housing 7 to which the supporting members 3, 4, 5, and 6 are fixed. The housing 7 is made of an insulating resin and has a frame shape, and the supporting members 3, 4, 5, and 6, which extend along both sides of the vibrator 2 in the width direction thereof, are fixed to the housing 7 by insert molding, and the vibrator 2 is thereby retained at the central region of the housing 7. Portions of the housing 7 at which the supporting members 3, 4, 5, and 6 are fixed to the housing 7 are hereinafter called fixing portions 3a, 4a, 5a, and 6a, respectively. The vibrator 2 serves as a free—free beam which vibrates in the thickness direction thereof in the bending vibration mode. The supporting members 3, 4, 5, and 6 are disposed at positions near two nodes of the vibrator 2.

In the vibrating gyroscope 1, although the supporting members 3, 4, 5, and 6 are provided at the bottom side of the vibrator 2, in actuality, other supporting members are fixed between the vibrator 2 and the housing 7 at the top side of the vibrator 2.

In addition, the supporting members 3, 4, 5, and 6 may be constructed such that the supporting members 3 and 4 are integral with each other and the supporting members 5 and 6 are integral with each other.

In the vibrating gyroscope 1 which is constructed as described above, predetermined electrodes (not shown) are formed at the top and the bottom surfaces of the vibrator 2, and the vibrator 2 vibrates in the thickness direction thereof in the bending vibration mode when a driving signal is applied to the electrodes via the supporting members. When an angular speed around the longitudinal direction of the vibrator 2 is applied to the vibrator 2 while it is vibrating in the thickness direction thereof in the bending vibration mode, the vibrator 2 starts to vibrate in the width direction thereof in the bending vibration mode due to the Coriolis force. The amplitude of this bending vibration of the vibrator 2 in the width direction thereof is detected by Coriolis-force detection electrodes (not shown) provided on the vibrator 2 and is transmitted via the supporting members. Accordingly, the angular speed applied to the gyroscope 1 can be detected.

Similar to other common electronic devices, the size of vibrating gyroscopes must be reduced. However, since the Coriolis force applied to a moving member is detected in the vibrating gyroscopes, when the weight of the housing which contains the vibrator is reduced in accordance with the miniaturization, a problem occurs in that the degree of vibration transmission to the outside increases and the temperature drift also increases. In addition, since the supporting members are also used as electric wires for transmitting the driving signal to the vibrator and receiving a detection signal from the vibrator, the weight of the housing cannot be increased by forming the housing with a metal.

SUMMARY OF THE INVENTION

Accordingly, in order to solve the above-described problems, preferred embodiments of the present invention provide a vibrating gyroscope in which the temperature drift performance is not degraded even when the size thereof is reduced and provide an electronic device including such a novel vibrating gyroscope.

A vibrating gyroscope according to a preferred embodiment of the present invention includes a vibrator and a housing which retains the vibrator with a plurality of supporting members, the supporting members being fixed to the vibrator at positions near at least one node of the vibrator, wherein the housing includes a plurality of fixing portions at which the supporting members are fixed to the housing and a rigid reinforcing plate made of a metal, the rigid reinforcing plate being continuous between positions near at least two of the fixing portions.

The rigid reinforcing plate is located near the first and second fixing portions. A portion of the rigid reinforcing plate opposite to the first fixing portion is integrally and continuously arranged with another portion of the rigid reinforcing plate opposite to the second fixing portion.

In addition, according to another preferred embodiment of the present invention, the vibrator has a substantially rectangular column shape and the supporting members extend from the vibrator to the housing at both sides of the vibrator in the width direction of the vibrator, and the rigid reinforcing plate is continuous between a position near a first one of the fixing portions of the supporting members extending at one side of the vibrator in the width direction of the vibrator, and a position near a second one of the fixing portions of the supporting members extending at the other side of the vibrator in the width direction of the vibrator.

In addition, according to a preferred embodiment of the present invention, the vibrator has a substantially rectangular column shape and has a plurality of nodes along the longitudinal direction thereof, the supporting members extend from each of the positions near the nodes of the vibrator to the housing at both sides of the vibrator in the width direction of the vibrator, and the rigid reinforcing plate is continuous between positions near the fixing portions of the supporting members extending at one side of the vibrator in the width direction of the vibrator, and the rigid reinforcing plate is continuous between positions near the fixing portions of the supporting members extending at the other side of the vibrator in the width direction of the vibrator.

In addition, according to a preferred embodiment of the present invention, the rigid reinforcing plate has a surface that is substantially perpendicular to the thickness direction of the vibrator. The rigid reinforcing plate may also include a surface that is substantially perpendicular to the longitudinal direction of the vibrator, and a surface that is substantially perpendicular to the width direction of the vibrator.

In addition, according to a preferred embodiment of the present invention, the housing is preferably made of an insulating resin and the rigid reinforcing plate is preferably embedded in the housing by insert molding.

Alternatively, according to another preferred embodiment of the present invention, the housing is preferably made of an insulating resin and the rigid reinforcing plate is preferably adhered to the housing.

In addition, according to a preferred embodiment of the present invention, the housing has a frame shape and surrounds the vibrator and the supporting members, and the rigid reinforcing plate defines a cover for protecting the vibrator and the supporting members.

In addition, according to a preferred embodiment of the present invention, the rigid reinforcing plate and the vibrator have approximately the same coefficient of thermal expansion.

In addition, the rigid reinforcing plate is preferably grounded.

In addition, an electronic device according to the present invention includes one of the above-described vibrating gyroscopes.

According to various preferred embodiments of the present invention, the supporting members are fixed to the housing at the fixing portions of the housing, and the rigid reinforcing plate made of a metal is disposed such that it is continuous between positions near at least two of the fixing portions. Therefore, the rigidity of the housing is increased and the vibration of the vibrator can be prevented from being transmitted to the outside. In addition, the temperature drift performance can be prevented from being degraded.

In addition, according to preferred embodiments of the present invention, a high-performance electronic device can be obtained by using the vibrating gyroscope according various preferred embodiments of the present invention.

Other features, elements, characteristics and advantages of the present invention will become apparent from the following detailed description of preferred embodiments thereof with reference to the attached drawings.

DETAILED DESCRIPTION OF PREFERRED EMBODIMENTS

Figure 1:
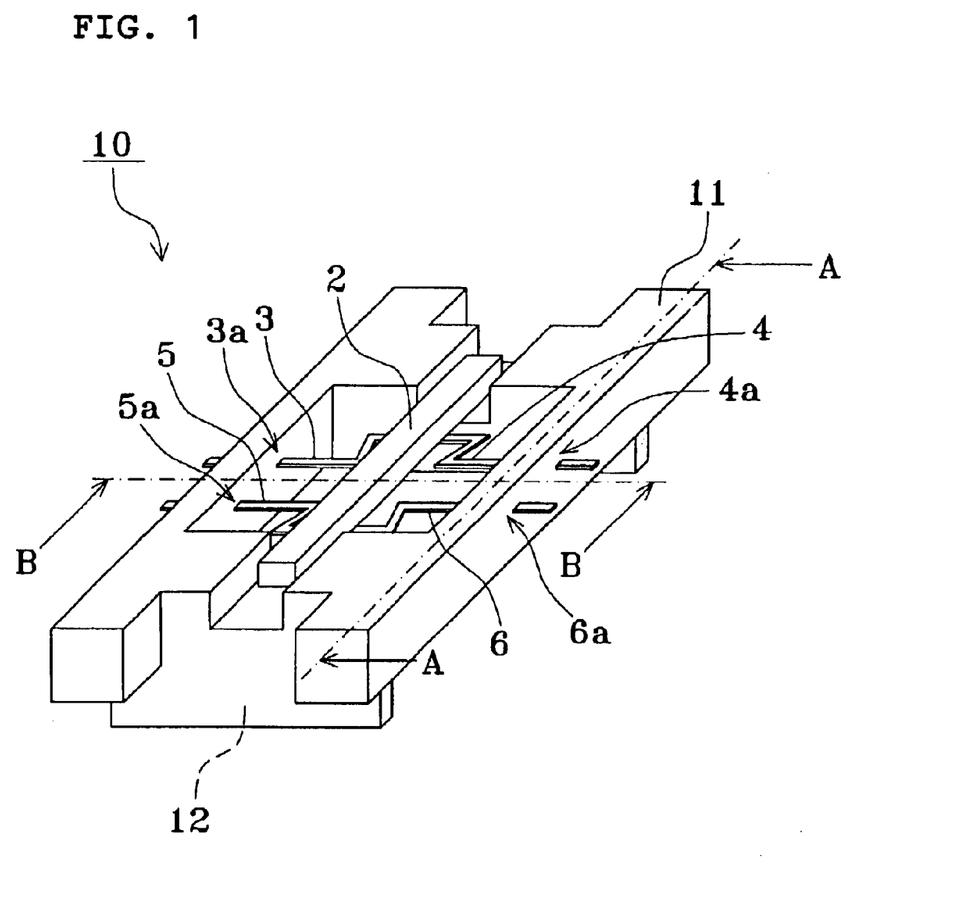
FIG. 1 is a perspective view of a vibrating gyroscope according to a preferred embodiment of the present invention.

FIG. 1 is a perspective view of a vibrating gyroscope according to a preferred embodiment of the present invention. In FIG. 1, components similar to those shown in FIG. 11 are denoted by the same reference numerals, and explanations thereof are thus omitted.

A vibrating gyroscope 10 according to a preferred embodiment of the present invention shown in FIG. 1 includes a housing 11 having a frame shape in place of the housing 7 of the known vibrating gyroscope 1. Supporting members 3, 4, 5, and 6 are fixed to the housing 11, and similarly to the above-described known vibrating gyroscope 1, portions of the housing 11 at which the supporting members 3, 4, 5, and 6 are fixed to the housing 11 are called fixing portions 3a, 4a, 5a, and 6a, respectively. The housing 11 is different from the housing 7 in that a rigid reinforcing plate 12 made of a metal is embedded in the housing 11 made of a resin by insert molding. The rigid reinforcing plate 12 and the vibrator 2 have approximately the same coefficient of thermal expansion, and although not shown in the figure, the rigid reinforcing plate 12 is grounded.

Figure 2:
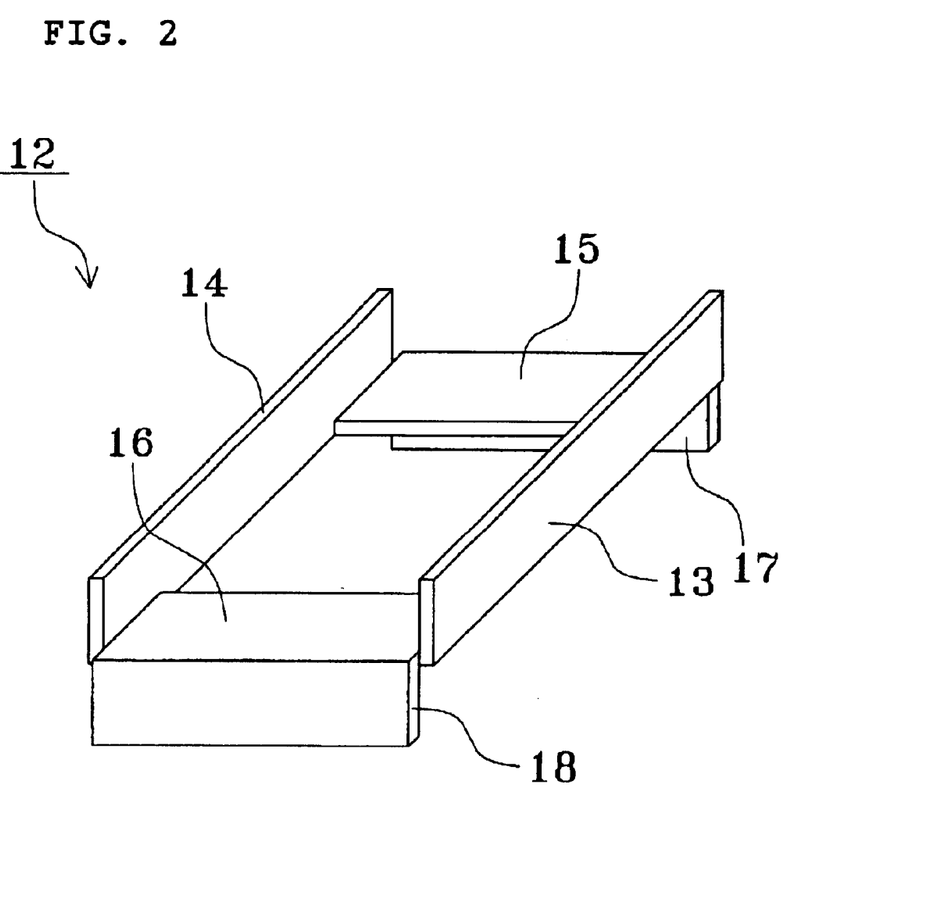
FIG. 2 is a perspective view of a rigid reinforcing plate included in a housing of the vibrating gyroscope shown in FIG. 1.

FIG. 2 is a perspective view showing the construction of the rigid reinforcing plate 12 which is viewed from the same direction as FIG. 1.

As shown in FIG. 2, the rigid reinforcing plate 12 includes reinforcing members 13 and 14 which extend in the longitudinal direction of the vibrator 2 and have surfaces which are substantially perpendicular to the width direction of the vibrator 2, reinforcing members 15 and 16 which extend in the width direction of the vibrator 2 and connect the reinforcing members 13 and 14 to each other, and reinforcing members 17 and 18 which are connected to the reinforcing members 15 and 16, respectively, which extend in the width direction of the vibrator 2, and which have surfaces that are substantially perpendicular to the longitudinal direction of the vibrator 2. The reinforcing members 13, 14, 15, 16, 17, and 18 are formed by bending a single metal plate.

Figure 3:
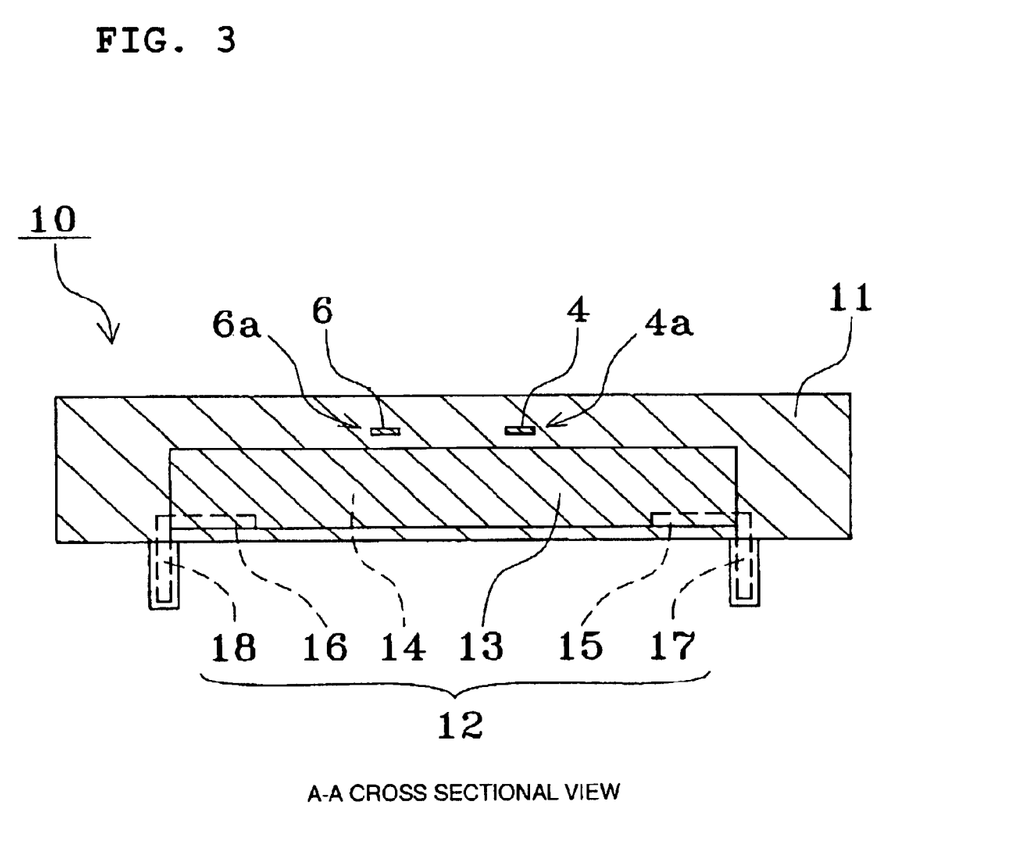
FIG. 3 is a sectional view of the vibrating gyroscope shown in FIG. 1 cut along line A—A.
Figure 4:
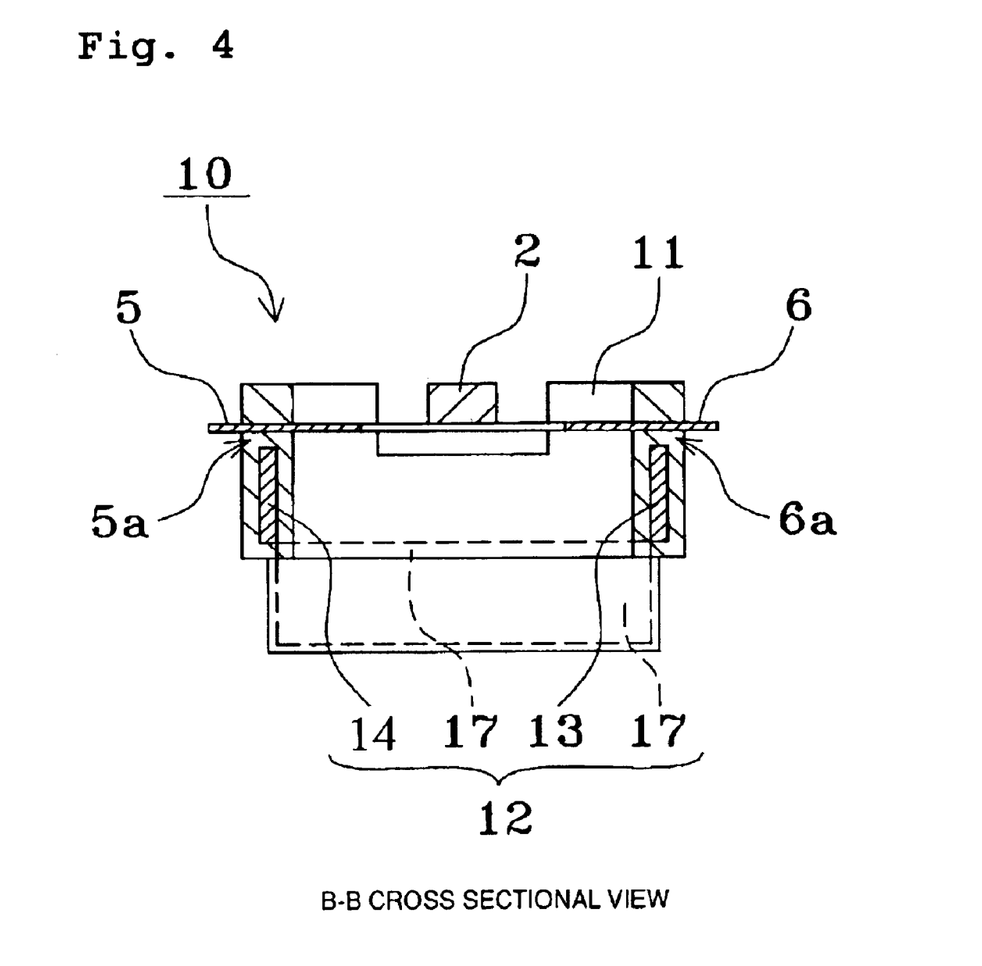
FIG. 4 is a sectional view of the vibrating gyroscope shown in FIG. 1 cut along line B—B.

FIG. 3 shows a sectional view of the vibrating gyroscope 10 shown in FIG. 1 cut along line A—A. This sectional view is obtained by cutting a part of the housing 11 shown in FIG. 1 in the thickness direction of the vibrator 2 along the longitudinal direction of the vibrator 2 such that the fixing portions 4a and 6a of the supporting members 4 and 6, respectively, are included in the sectional view and the reinforcing member 13 of the rigid reinforcing plate 12 shown in FIG. 2 is sliced. In addition, FIG. 4 shows a sectional view of the vibrating gyroscope 10 shown in FIG. 1 cut along line B—B. This sectional view is obtained by cutting the vibrating gyroscope 10 shown in FIG. 1 in the thickness direction of the vibrator 2 along the width direction of the vibrator 2 such that the fixing portions 5a and 6a of the supporting members 5 and 6 are included in the sectional view. In order to make the figures simple, only the hidden portions of the rigid reinforcing plate 12 are shown by dashed lines in FIGS. 3 and 4.

As is clear from FIG. 3, the reinforcing member 13 of the rigid reinforcing plate 12 is located at a position near the fixing portion 4a of the supporting member 4 and the fixing portion 6a of the supporting member 6. In other words, the rigid reinforcing plate 12 is placed close to the fixing portions 4a and 6a. Accordingly, the reinforcing member 13 of the rigid reinforcing plate 12 is continuous between the positions near the fixing portions 4a and 6a of the two supporting members 4 and 6 which extend at one side of the vibrator 2 in the width direction thereof. A portion of the rigid reinforcing member 13 opposite to the fixing portion 4a is integrally and continuously arranged with another potion of the rigid reinforcing member 13 opposite to the fixing portion 6a.

The supporting members 3, 4, 5, and 6 are arranged symmetrically in the width direction of the vibrator 2, and the rigid reinforcing plate 12 is also symmetric in the width direction of the vibrator 2. Accordingly, the reinforcing member 14 of the rigid reinforcing plate 12 is also continuous between the positions near the fixing portions 3a and 5a of the two supporting members 3 and 5 which extend at the other side of the vibrator 2 in the width direction thereof.

As described above, the rigid reinforcing plate 12 is continuous between the positions near the fixing portions 4a and 6a of the two supporting members 4 and 6 extending at one side of the vibrator 2 in the width direction thereof and between the positions near the fixing portions 3a and 5a of the two supporting members 3 and 5 extending at the other side of the vibrator 2 in the width direction thereof. Therefore, the rigidity between the fixing portions 4a and 6a and the rigidity between the fixing portions 3a and 5a are increased. Since the reinforcing members 13 and 14 have surfaces perpendicular to the width direction of the vibrator 2, the rigidity of the housing 11 against bending of the vibrator 2 in the thickness direction thereof is particularly increased, and particularly the vibration of the vibrator 2 due to driving can be prevented from being transmitted to the outside via the housing 11.

In the rigid reinforcing plate 12, the reinforcing members 13 and 14 are connected to each other by the reinforcing members 15 and 16 which extend in the width direction of the vibrator 2. Accordingly, the rigid reinforcing plate 12 is also continuous between the position near the fixing portions 4a of the supporting member 4 extending at one side of the vibrator 2 in the width direction thereof and the position near the fixing portions 3a of the supporting member 3 extending at the other side of the vibrator 2 in the width direction thereof. Similarly, the rigid reinforcing plate 12 is also continuous between the position near the fixing portions 6a of the supporting member 6 and the position near the fixing portions 5a of the supporting member 5. As shown in FIG. 4, the rigid reinforcing member 13 located near the supporting member 6 is integrally and continuously formed with the rigid reinforcing member 14 located near the supporting member 5 via the reinforcing members 15 and 16. Therefore, the rigidity between the fixing portions 4a and 3a and that between the fixing portions 6a and 5a are increased. Since the reinforcing members 15 and 16 have surfaces which are substantially perpendicular to the thickness direction of the vibrator 2, the rigidity of the housing 11 against bending of the vibrator 2 in the width direction thereof is greatly increased, and particularly the vibration of the vibrator 2 due to the Coriolis force can be prevented from being transmitted to the outside via the housing 11.

Furthermore, in the rigid reinforcing plate 12, since the reinforcing members 17 and 18 arranged continuously from the reinforcing members 15 and 16, respectively, have surfaces that are substantially perpendicular to the longitudinal direction of the vibrator 2, the rigidity of the housing 11 against bending of the vibrator 2 in the thickness direction thereof is greatly increased, and the vibration of the vibrator 2 can be prevented from being transmitted to the outside via the housing 11.

In addition, in the vibrating gyroscope 10, the coefficient of thermal expansion of the rigid reinforcing plate 12 embedded in the housing 11 by insert molding is close to that of the vibrator 2. More specifically, the coefficient of thermal expansion of the piezoelectric material forming the vibrator 2 is, for example, approximately $1.1 \times 10 e^{-6}$ per 1° C., and the coefficient of thermal expansion of the resin forming the housing 11 is, for example, approximately $5 \times 10 e^{-6}$ to $55 \times 10 e^{-6}$ per 1° C., including large individual differences. Accordingly, the coefficient of thermal expansion of the resin may be close, or different by a large amount, compared with that of the piezoelectric material, and cannot be controlled. On the other hand, the coefficient of thermal expansion of the rigid reinforcing plate 12 is, for example, approximately $4.5 \times 10 e^{-6}$, which is close to that of the piezoelectric material, and is stable. Therefore, the temperature drift performance of the vibrating gyroscope 10 can be prevented from being degraded. In the present specification, the temperature drift means the variation due to temperature variation in the output signal when no angular speed is input (null voltage).

Figure 5A:
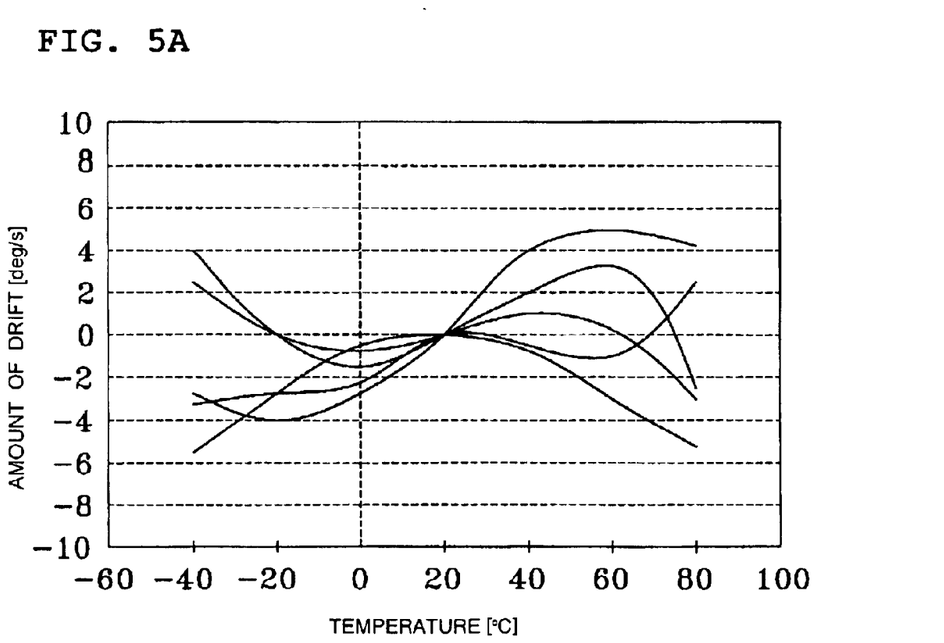
FIGS. 5A is a characteristic diagram showing the temperature drift obtained by a known vibrating gyroscope and 5B is a characteristic diagram showing the temperature drift obtained by the vibrating gyroscope shown in FIG. 1.
Figure 5B:
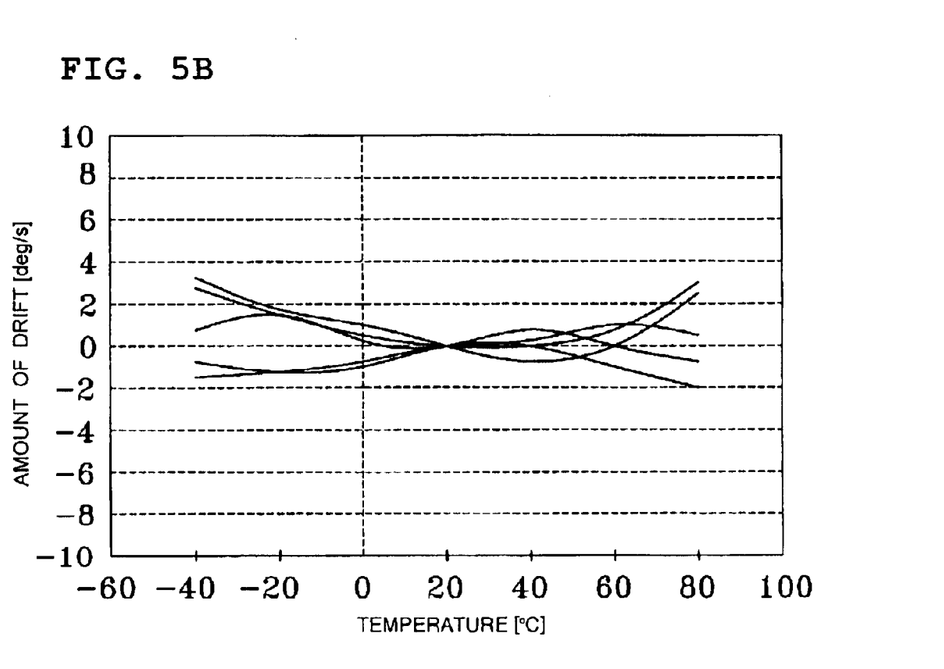

FIG. 5A is a characteristic diagram showing the temperature drift caused by samples of vibrating gyroscopes similar to the known vibrating gyroscope 1 shown in FIG. 11, and FIG. 5B is a characteristic diagram showing the temperature drift caused by samples of vibrating gyroscopes similar to the vibrating gyroscope 10 according to preferred embodiments of the present invention. In FIGS. 5A and 5B, the temperature drift is expressed in terms of the angular speed corresponding to the voltage instead of the voltage itself. As is clear from FIGS. 5A and 5B, the amount of drift caused by the samples of the vibrating gyroscope 10 according to preferred embodiments of the present invention which includes the housing 11 with the rigid reinforcing plate 12 is approximately one-half of that caused by the samples of the known vibrating gyroscope 1.

In addition, in the vibrating gyroscope 10, the rigid reinforcing plate 12, which is embedded in the housing 11 by insert-molding, is grounded. Since the rigid reinforcing plate 12 is arranged such that it surrounds the vibrator 2, the rigid reinforcing plate 12 functions as a shield for the vibrator 2. Accordingly, the angular speed measurement can be prevented from being affected by an electromagnetic wave incident from the outside.

Although the rigid reinforcing plate 12 is combined with the housing 11 preferably by insert-molding in the vibrating gyroscope 10, it may also be formed inside the housing 11 by a method other than insert-molding. For example, the housing and the rigid reinforcing plate may be formed separately and be bonded together with an adhesive. Also in this case, similar effects are obtained.

In addition, it is not necessary to make the coefficient of thermal expansion of the rigid reinforcing plate 12 the same as that of the vibrator 2 or to ground the rigid reinforcing plate 12.

Since the rigid reinforcing plate 12 is constructed such that the two reinforcing members 13 and 14 are connected to each other by the two reinforcing members 15 and 16, the rigid reinforcing plate 12 has a frame shape having an opening at the central region thereof. This structure is used so that trim adjustment of the vibrator 2 can be performed from the bottom surface in accordance with requirements after retaining the vibrator 2 by the housing 11. However, the shape of the rigid reinforcing plate 12 is not limited to the frame shape. In addition, the rigid reinforcing plate 12 may also be formed of a single reinforcing member, or three or more reinforcing members. Furthermore, although the two reinforcing members 15 and 16 have the shape like a flat plate, they may also have ribs which extend in the width direction of the vibrator 2 so that the rigidity against bending is increased.

In addition, in the vibrating gyroscope 10, the rigid reinforcing plate 12 embedded in the housing 11 by insert molding has both the structure in which the rigid reinforcing plate 12 is continuous between each of the positions near the fixing portions of the supporting members extending at one side of the vibrator 2 in the width direction thereof and each of the positions near the fixing portions of the supporting members extending at the other side of the vibrator 2 in the width direction thereof, and the structure in which the rigid reinforcing plate 12 is continuous between the positions near the fixing portions of the supporting members extending at either side of the vibrator 2 in the width direction thereof. However, the rigid reinforcing plate may have only one of the above-described structures. In addition, although the rigid reinforcing plate 12 includes all of the surfaces which are substantially perpendicular to the longitudinal direction of the vibrator, the surfaces which are substantially perpendicular to the width direction of the vibrator, and the surfaces which are substantially perpendicular to the thickness direction of the vibrator, only one, two, or none of the above-described surfaces may be provided.

Figure 6:
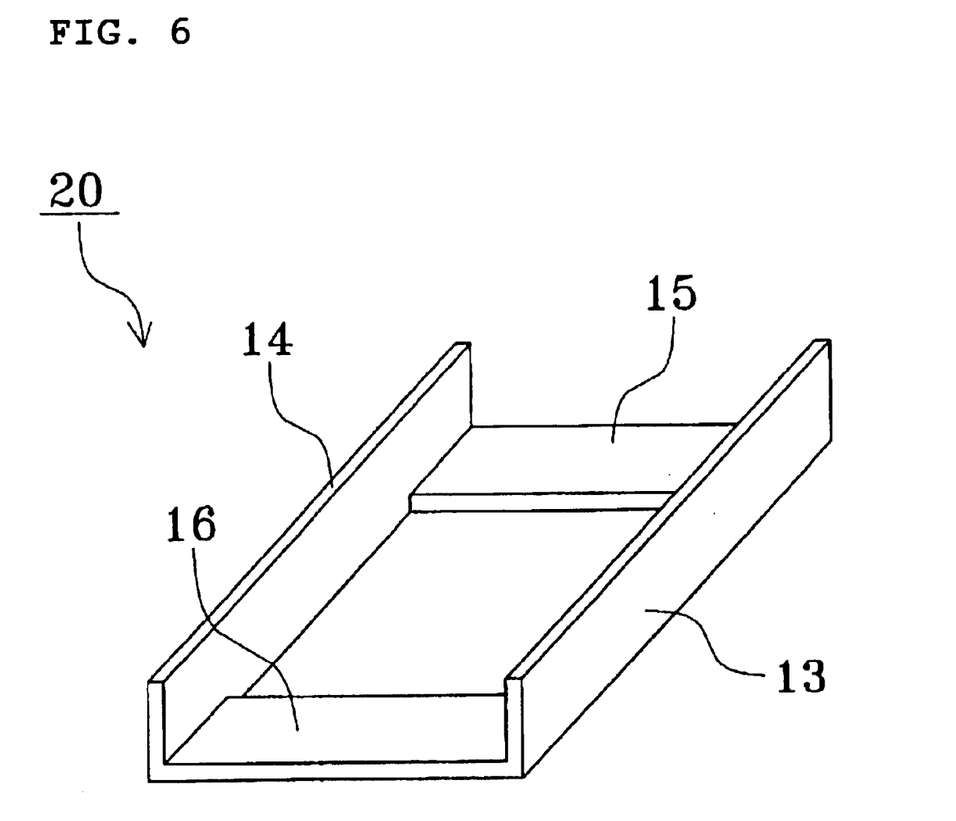
FIG. 6 is a perspective view of a rigid reinforcing plate according to another preferred embodiment of the present invention.
Figure 7:
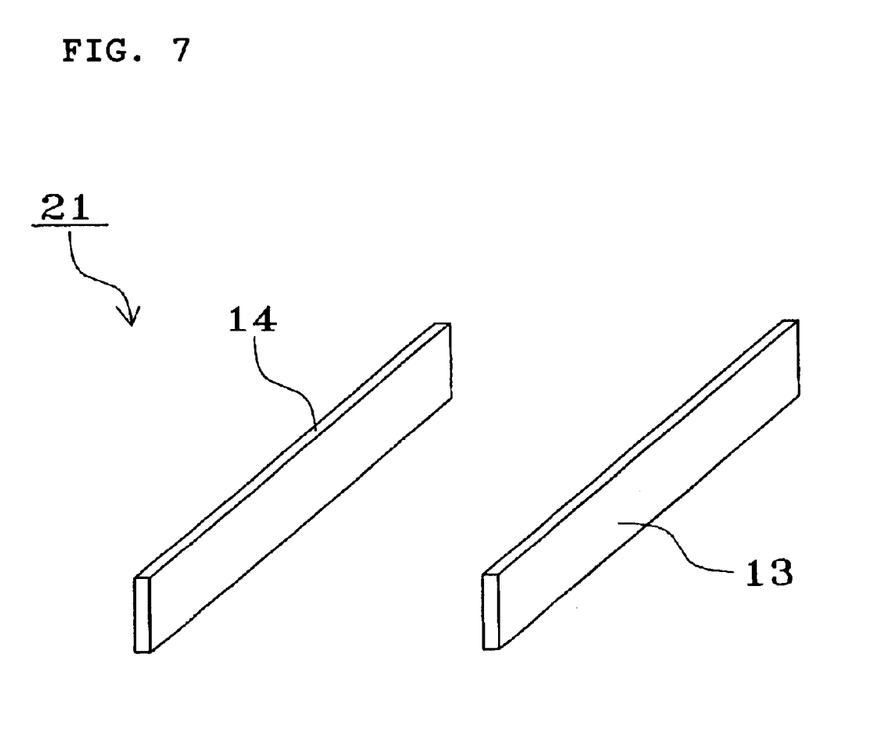
FIG. 7 is a perspective view of a rigid reinforcing plate according to another preferred embodiment of the present invention.

FIGS. 6 and 7 are perspective views of rigid reinforcing plates according to other preferred embodiments of the present invention. Similarly to the rigid reinforcing plate 12, each of rigid reinforcing plates 20 and 21 shown in FIGS. 6 and 7, respectively, is also embedded in a housing. Components similar to those shown in FIG. 2 are denoted by the same reference numerals.

The rigid reinforcing plate 20 shown in FIG. 6 does not include reinforcing members corresponding to the reinforcing members 17 and 18 included in the rigid reinforcing plate 12. However, by forming reinforcing members 13, 14, 15, and 16 by bending a single metal plate, the rigid reinforcing plate 20 has both the structure in which the rigid reinforcing plate 20 is continuous between each of the positions near the fixing portions of the supporting members extending at one side of the vibrator in the width direction thereof and each of the positions near the fixing portions of the supporting members extending at the other side of the vibrator in the width direction thereof, and the structure in which the rigid reinforcing plate 20 is continuous between the positions near the fixing portions of the supporting members which extend at either side of the vibrator in the width direction thereof. In addition, the rigid reinforcing plate 20 has surfaces which are substantially perpendicular to the width direction of the vibrator and surfaces which are substantially perpendicular to the thickness direction of the vibrator.

In addition, the rigid reinforcing plate 21 shown in FIG. 7 has a construction such that the reinforcing members 15 and 16 are removed from the rigid reinforcing plate 20, and includes only two reinforcing members 13 and 14. This rigid reinforcing plate 21 has the structure in which the rigid reinforcing plate 21 is continuous between the positions near the fixing portions of the supporting members extending at either side of the vibrator. In addition, the rigid reinforcing plate 21 has surfaces which are substantially perpendicular to the width direction of the vibrator.

Figure 8:
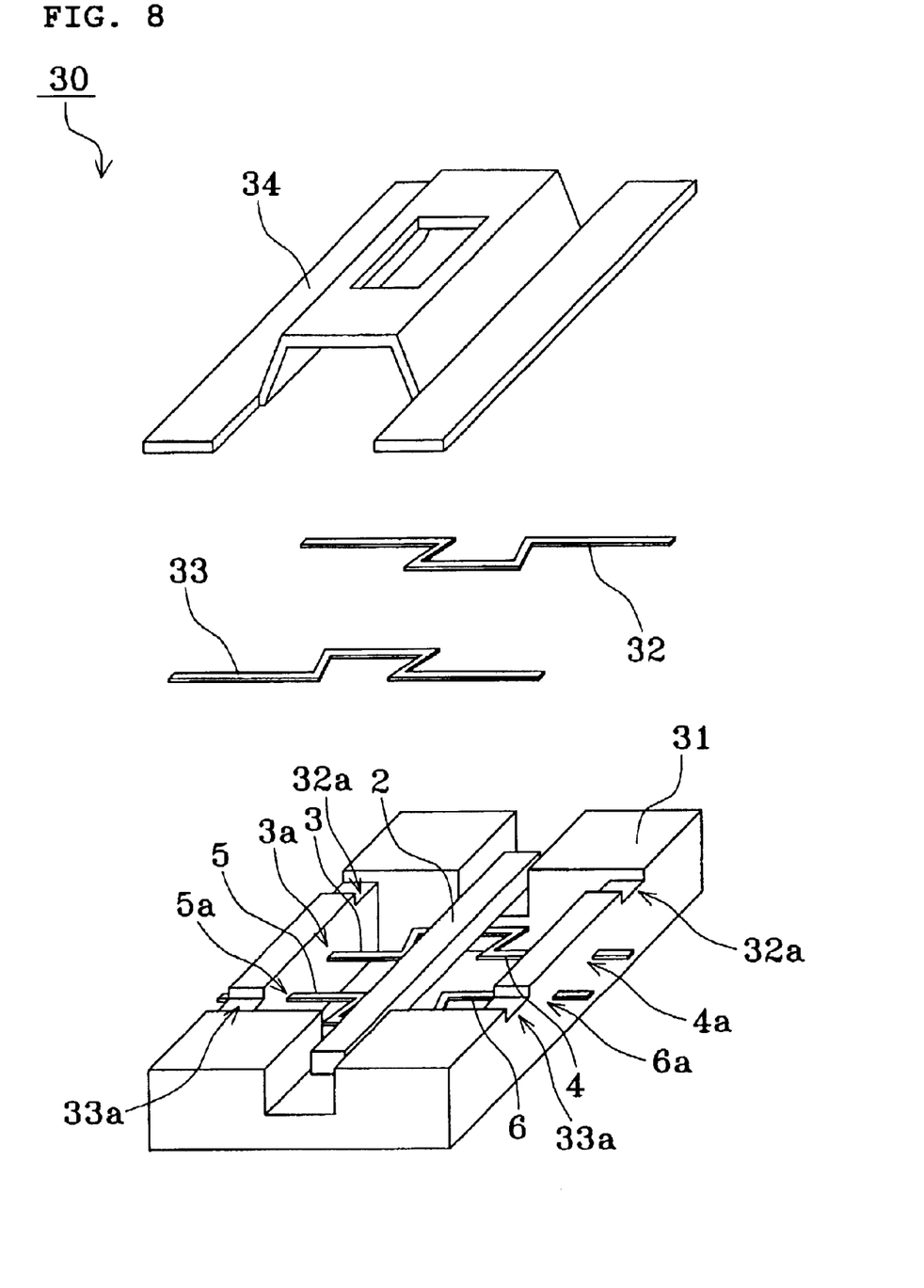
FIG. 8 is an exploded perspective view of a vibrating gyroscope according to another preferred embodiment of the present invention.

FIG. 8 is an exploded perspective view of a vibrating gyroscope according to another preferred embodiment of the present invention. In FIG. 8, components which are the same as or similar to those shown in FIG. 11 are denoted by the same reference numerals and explanations thereof are thus omitted.

With reference to FIG. 8, a vibrating gyroscope 30 includes a housing 31 having a frame shape in place of the housing 7 of the known vibrating gyroscope 1. Supporting members 3, 4, 5, and 6 are fixed to the housing 31, and similarly to the above-described known vibrating gyroscope 1, portions of the housing 31 at which the supporting members 3, 4, 5, and 6 are fixed to the housing 31 are called fixing portions 3a, 4a, 5a, and 6a, respectively. The housing 31 is different from the housing 7 in that the housing 31 includes notch portions which function as fixing portions 32a and 33a after supporting members 32 and 33, which will be described below, are attached thereto.

The vibrating gyroscope 30 includes additional supporting members 32 and 33, which are omitted in the vibrating gyroscopes 1 and 10. The central portions of the supporting members 32 and 33 are fixed to a vibrator 2 at the top side of the vibrator 2, and both ends of the supporting members 32 and 33 are fixed to the notch portions formed at the top of the housing 31. Although each of the supporting members 32 and 33 is formed of a single member, from the viewpoint that one point on the vibrator and one point on the housing are connected to each other, it may be considered such that each of the supporting members 32 and 33 are effectively constructed of two supporting members.

In addition, the vibrating gyroscope 30 also includes a metal cover 34 which protects the vibrator 2 and the supporting members and which also functions as a rigid reinforcing plate by being adhered on and fixed to the housing 31 at the top side thereof. The cover 34 is formed by bending a single metal plate, has approximately the same coefficient of thermal expansion as that of the vibrator 2, and is grounded. In addition, the cover 34 has surfaces which are substantially perpendicular to the width direction of the vibrator 2 and surfaces which are substantially perpendicular to the thickness direction of the vibrator 2. Although the cover 34 includes an opening so that trim adjustment of the vibrator 2 can be performed from the top surface, it is not always necessary to form the opening.

The cover 34 is fixed to the top surface of the housing 31 such that the surface that is substantially perpendicular to the thickness direction of the vibrator 2 is adhered on the top surface of the housing 31. Accordingly, the cover 34 is placed close to the fixing portions 32a and 33a positioned at the top of the housing 31. More specifically, the cover 34 is continuous between each of the positions near the fixing portions 32a and 33a of the two supporting members 32 and 33 extending at one side of the vibrator 2 in the width direction thereof and each of the positions near the fixing portions 32a and 33a of the two supporting members 32 and 33 extending at the other side of the vibrator 2 in the width direction thereof. In addition, the cover 34 is also continuous between the positions near the fixing portions 32a and 33a of the supporting members 32 and 33 extending at one side of the vibrator 2 in the width direction thereof and between the positions near the fixing portions 32a and 33a of the supporting members 32 and 33 extending at the other side of the vibrator 2 in the width direction thereof.

Accordingly, the construction and function of the cover 34 is almost the same as those of the rigid reinforcing plate 12 of the vibrating gyroscope 10, and the cover 34 also increases the rigidity of the housing 31. Therefore, in the vibrating gyroscope 30, the vibration of the vibrator 2 can be prevented from being transmitted to the outside via the housing 31. In addition, the temperature drift performance can be prevented from being degraded.

Figure 9:
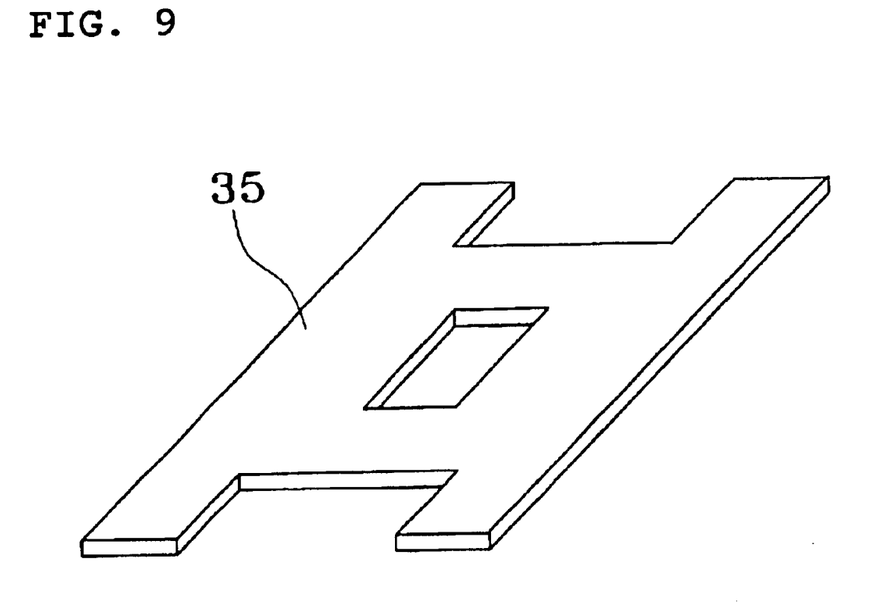
FIG. 9 is a perspective view of a cover according to another preferred embodiment of the present invention.

Although the housing 31 of the vibrating gyroscope 30 does not have a rigid reinforcing plate similar to the one used in the vibrating gyroscope 10, the vibrating gyroscope may also be constructed such that a cover having the function of the rigid reinforcing plate is added to the vibrating gyroscope 10. If the rigid reinforcing plate is embedded in the housing, it is not necessary for the cover to increase the rigidity by a large amount. Accordingly, a single flat plate similar to a cover 35 shown in FIG. 9 may be used as the cover. In such a case, the rigidity of the housing can be further increased, and the vibration of the vibrator can be more reliably prevented from being transmitted to the outside. In addition, the temperature drift performance can be further improved.

Figure 10:
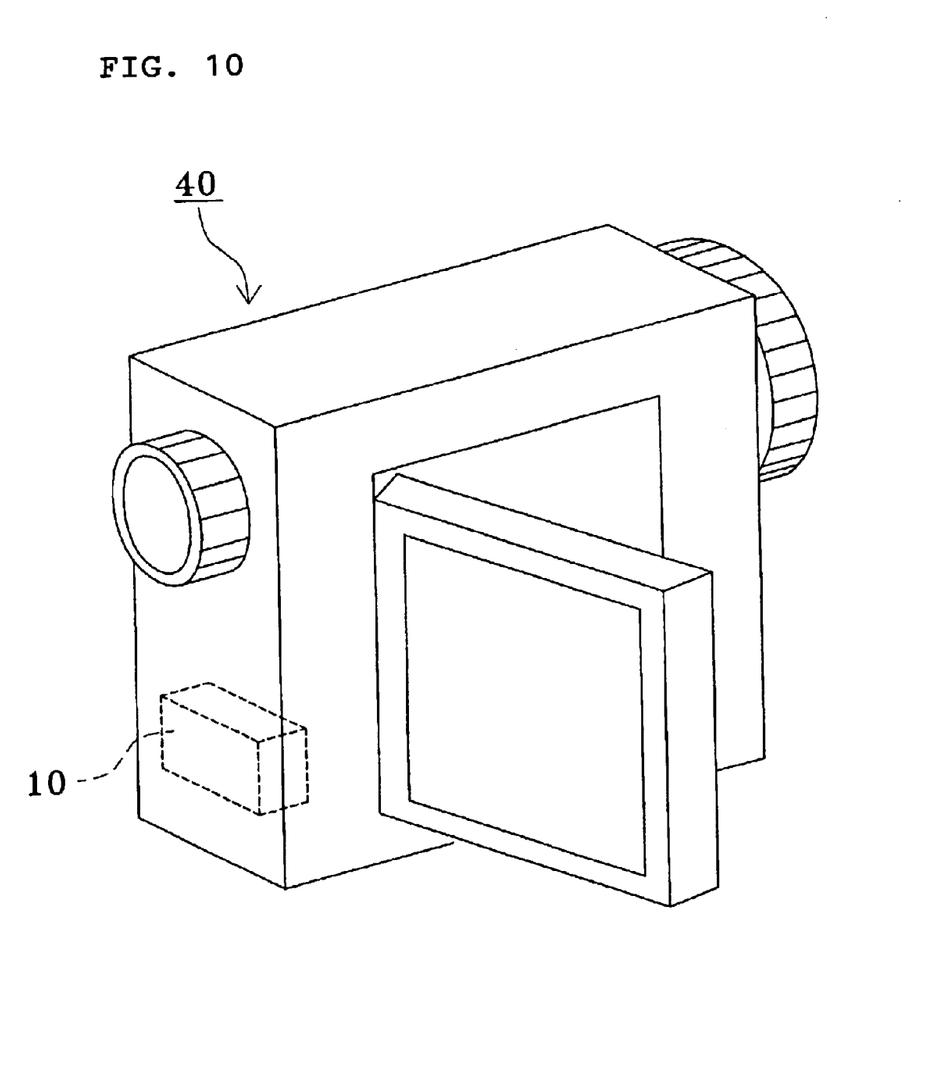
FIG. 10 is a perspective view of an electronic device according to a preferred embodiment of the present invention.

FIG. 10 shows a perspective view of a video camera as an example of an electronic device according to another preferred embodiment of the present invention. With reference to FIG. 10, the video camera 40 includes the vibrating gyroscope 10 according to other preferred embodiments of the present invention for correcting camera shake.

Since the vibrating gyroscope 10 according to various preferred embodiments of the present invention is included, the performance of the video camera 40 is greatly improved.

The electronic device according to preferred embodiments of the present invention is not limited to a video camera. The present invention may also be applied to various kinds of electronic devices including the novel vibrating gyroscope, for example, a digital camera using the vibrating gyroscope for correcting camera shake, a navigation system using the vibrating gyroscope for position detection, a roll detection system for an automobile, and other possible uses in various apparatuses.

The present invention is in no way restricted to the preferred embodiments described above. Instead, various adaptations and modifications may be made with regard to specific patterns of the main line and sub line, the number of layers for layered structures, and other characteristics and features, without departing from the spirit or scope of the invention.

What is claimed is:

1. A vibrating gyroscope comprising:
    a vibrator; and
    a housing which retains the vibrator via a plurality of supporting members provided therein, the supporting members being fixed to the vibrator at positions near at least one node of the vibrator;
    wherein the housing includes a plurality of fixing portions at which the supporting members are fixed to the housing and a rigid reinforcing plate made of a metal, the rigid reinforcing plate being continuous between positions near at least two of the fixing portions; and
    wherein the rigid reinforcing plate is configured to increase the rigidity of the housing such that vibration of the vibrator is prevented from being transmitted to outside of the housing; and
    wherein the housing is made of an insulating resin and the rigid reinforcing plate is insert molded so as to be embedded in the housing.

2. A vibrating gyroscope according to claim 1, wherein the supporting members extend from the vibrator to the housing at both sides of the vibrator in the width direction of the vibrator, and the rigid reinforcing plate is continuous between a position near a first one of the fixing portions of the supporting members extending at one side of the vibrator in the width direction of the vibrator and a position near a second one of the fixing portions of the supporting members extending at the other side of the vibrator in the width direction of the vibrator.

3. A vibrating gyroscope according to claim 1, wherein the vibrator has a plurality of nodes along the longitudinal direction thereof, the supporting members extend from each of the positions near the nodes of the vibrator to the housing at both sides of the vibrator in the width direction of the vibrator, the rigid reinforcing plate is continuous between positions near the fixing portions of the supporting members extending at one side of the vibrator in the width direction of the vibrator, and the rigid reinforcing plate is continuous between positions near the fixing portions of the supporting members extending at the other side of the vibrator in the width direction of the vibrator.

4. A vibrating gyroscope according to claim 2, wherein the rigid reinforcing plate has a surface that is substantially perpendicular to the thickness direction of the vibrator.

5. A vibrating gyroscope according to claim 2, wherein the rigid reinforcing plate has a surface that is substantially perpendicular to the longitudinal direction of the vibrator.

6. A vibrating gyroscope according to claim 2, wherein the rigid reinforcing plate has a surface that is substantially perpendicular to the width direction of the vibrator.

7. A vibrating gyroscope according to claim 1, wherein the housing is made of an insulating resin and the rigid reinforcing plate is adhered to the housing.

8. A vibrating gyroscope according to claim 1, wherein the housing has a frame shape and surrounds the vibrator and the supporting members.

9. A vibrating gyroscope according to claim 1, wherein the rigid reinforcing plate defines a cover for protecting the vibrator and the supporting members.

10. A vibrating gyroscope according to claim 1, wherein the rigid reinforcing plate and the vibrator have approximately the same coefficient of thermal expansion.

11. A vibrating gyroscope according to claim 1, wherein the rigid reinforcing plate is grounded.

12. A vibrating gyroscope according to claim 1, wherein the vibrator has a substantially rectangular column shape.

13. A vibrating gyroscope according to claim 1, wherein the supporting members extend from the vibrator to the housing at both sides of the vibrator in the width direction of the vibrator.

14. An electronic device comprising a vibrating gyroscope according to claim 1.

15. An electronic device according to claim 14, wherein the electronic device is a camera.

16. An electronic device according to claim 15, wherein the electronic device is a navigational system.

* * * * *